INVENTOR.
Katsumi Takami
BY
Mestern & Mestern

# United States Patent Office 3,293,595
Patented Dec. 20, 1966

3,293,595
TELEMETERING SYSTEM
Katsumi Takami, Kitatama-gun, Tokyo-to, Japan, assignor to Kabushiki Kaisha Hitachi Seisakusho, Tokyo-to, Japan, a joint-stock company of Japan
Filed Dec. 6, 1963, Ser. No. 328,701
Claims priority, application Japan, Dec. 29, 1962, 37/59,761
3 Claims. (Cl. 340—2)

This invention relates to telemetering systems, and more particularly it relates to a new telemetering system capable of transmitting sonic waves (sound or supersonic waves) as the energy source and receiving the signal as an electromagnetic wave.

Heretofore, telemetering systems employed in medical electronics have been of the form wherein a power supply source and a signal transmitter (oscillator) are installed within a capsule and operated to radiate frequencies in response to variations of a measured quantity. In such a system, however, since the capsule must house both a power supply source (dry cell) and an oscillator, there have been various disadvantages such as the tendency of the capsule to be large, thereby to cause inconvenience in swallowing the capsule in the case of oral introduction, and difficulty, due to rapid dry cell consumption, of measurement for long periods, which disadvantages have met much criticism. As one attempt to overcome these difficulties, there has been proposed a system wherein a transistor oscillator functioning doubly as a rectifier, or a tank circuit which is a pure passive network is sealed in a capsule, and the system is operated by intermittently sending electromagnetic energy to the capsule and its content from the outside and detecting the measurand from the frequency of electromagnetic waves sent back also in an intermittent manner. In this system, although the dimensions of the capsule are, indeed, small, an extremely high electromagnetic energy must be sent toward the capsule (for example, 280 volts in terms of antenna output voltage). Furthermore, it is necessary to employ a considerably complicated circuit composition and arrangement such as a control circuit for intermittent radiation of energy and a control circuit for detecting the signal reflected back during the time interval when the energy radiation is being interrupted.

It is an object of the present invention, in its broad aspect, to overcome such difficulties as described above in the conventional systems.

More specifically, it is an object to provide a new telemetering system whereby continuous measurement can be accomplished.

It is another object to provide a telemetering system as defined above of extremely simple circuit composition and arrangement.

It is still another object to provide a signal transmitter of extremely miniature size and simple construction, suitable for installation within a detecting unit such as a capsule to be used in connection with the system according to the invention.

It is a further object to provide a system as defined above which is effectively applicable to a wide range of uses.

The foregoing objects, as well as various advantages, have been achieved by the present invention, which, briefly described, resides in a telemetering system wherein energy is supplied to the detecting means in the form of sound waves or supersonic waves, and the variations of the measurand are sent back from the detecting means as signals in the form of electromagnetic waves.

The nature, principle, and details of the invention will be more clearly apparent by reference to the following description with respect to preferred embodiments of the invention, taken in conjunction with the accompanying drawing in which like parts are designated by like reference characters, and in which.

Figure 1:
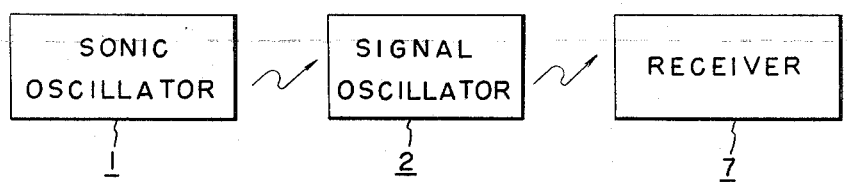
FIGURE 1 is a block diagram indicating the essential components of the telemetering system according to the invention.

Referring to FIGURE 1, the energy required for transmitting the measurand signals in the telemetering system shown is supplied by a variable-frequency sonic (sound or ultrasonic) oscillator 1. For this oscillator 1, a magnetostrictive (or electrostrictive) transmitter is used, which is adapted to have a flat output characteristic over a frequency band which is somewhat wide.

Figure 2:
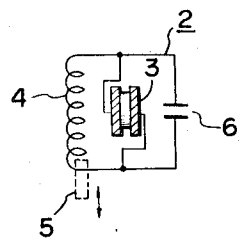
FIGURE 2 is an electrical circuit diagram showing an example of the signal transmitter according to the invention suitable for use in the system indicated in FIGURE 1.

The sound wave energy transmitted by the oscillator 1 is received by a capsule containing a signal oscillator 2 which is adapted to be driven by the said energy to transmit signals in response to variations of a measurand. The specific circuit of one example of this signal oscillator 2 is shown in FIGURE 2. This circuit includes a piezoelectric vibrator 3 having a frequency characteristic the resonance point of which is substantially flat over a frequency band of somewhat wide width. The vibrator 3 is connected in parallel with an inductance element 4 provided with a core 5 which is physically displaced by pressure and with a capacitor 6 forming a tank circuit with the inductance element 4.

The electromagnetic signals transmitted by the signal oscillator 2 are received by a receiver 7 which is provided with an antenna and includes an amplitude resonance detector (for example, a cathode-ray oscilloscope).

When, in the echo telemetering system of the above-described composition and arrangement, sonic (sound wave or ultrasonic wave) energy is emitted from the oscillator 1, a voltage with a frequency equal to the frequency of the sound wave vibration is generated in the piezoelectric vibrator 3. Since the resonance point of the vibrator 3 is taken to cover a relatively wide band when the frequency of the ultrasonic oscillation is gradually varied, and this frequency coincides with the resonance frequency of the tank circuit 4, 6, the radiation of the electromagnetic wave from the capsule 2 becomes a maximum. Accordingly, the received voltage at the receiver 7 also becomes a maximum.

Therefore, in the case wherein, for example, the measurand is pressure, the core 5 is caused to be displaced to cause the resonance frequency of the tank circuit to vary.

Accordingly, by determing the oscillation frequency of the oscillator 1 which causes the received voltage of the receiver 7 to be the maximum, the voltage can be readily determined by calibration.

The above description relates to measurement of pressure. For measurement of a temperature, a suitable arrangement is that wherein the core 5 is omitted, and the capacitor 6 is replaced by a ceramic capacitor having an extremely high temperature coefficient. In this case, the resonance frequency of the tank circuit varies greatly with temperature. By determining this resonance frequency by sweeping the oscillation frequency of the oscillator 1, the temperature can also be readily detected.

Figure 3:
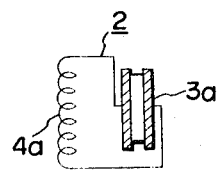
FIGURE 3 is a circuit diagram showing another embodiment of the signal transmitter of the present invention.

In the case of temperature measurement, if the piezoelectric vibrator 3 is caused to operate directly as a temperature transducer, the circuit within the capsule will become even simpler as illustrated by the example indicated in FIGURE 3. In this circuit according to the invention, the vibrator $3_a$ has a Q value which is selected to be suitably high, and the vibrator type is selected from among a Rochelle salt piezoelectric vibrator, a barium titanate vibrator, and a quartz crystal piezoelectric vibrator (a Y-cut piece of quartz crystal with a side ratio selected to be approximately 1:1, having a frequency temperature coefficient of the order of $10^{-3}$/deg. C.) in which the cutting directions have been selected to produce as large a frequency temperature coefficient as possible. This vibrator $3_a$ is connected to an inductance element $4_a$ of very low temperature dependence.

Since, by the above-described arrangement, the resonance frequency of the vibrator $3_a$ varies widely with temperature, by frequency sweeping the frequency of the oscillator 1 (in this case also, the output frequency characteristic of the wave transmitter of the oscillator 1 is selected to be substantially flat) and thereby determining the point at which the output of the receiver 7 becomes maximum, it is possible to determine temperature from frequency.

As described above, according to the system of this invention, energy is supplied as sound waves or ultrasonic waves, and signals are sent back as electromagnetic waves. Therefore, since the form of energy sent to the detecting means differs from that sent back, it is possible to receive signals as driving energy is simultaneously emitted. Accordingly, it is not necessary to carry out energy emission and signal reception alternately and intermittently as in the case of known types of telemetering systems. As a result, continuous telemetering becomes possible, and, moreover, the circuit composition and arrangement of the transmitter and receiver are greatly simplified. Furthermore, the construction of the transmitter within the capsule can be greatly miniaturized and simplified by the invention. No battery is required for the circuit of oscillator 2 since the piezoelectric vibrator means is the sole power source required by said oscillator.

It is to be observed that the system of the invention is not limited to its applications relating to medical electronics but is effectively applicable to a wide range of uses, particularly to non-contact measurements for telemetering measurands such as temperature, pressure, and displacements.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. A telemetering system comprising means for emitting compressional wave energy and varying the frequency of said wave; vibrator means as sole power source for receiving said compressional wave and transducing said compressional wave energy into electrical energy; a resonance circuit, the resonance frequency of which varies in response to variation in a value to be measured, for converting the electric energy supplied from said vibrator means into an electromagnetic wave whose frequency varies in response to the variation of said resonance frequency and emitting said electromagnetic wave; and means for receiving said electromagnetic wave and detecting said resonance frequency.

2. The telemetering system as defined in claim 1, wherein said resonance circuit consists of a capacitor; an inductance element provided with a displaceable core connected in parallel to said capacitor; said vibrator being connected therein in parallel to said inductance element.

3. A telemetering system for measuring temperature comprising means for emitting compressional wave energy and varying the frequency of said wave; vibrator means as sole power source for receiving said compressional wave and transducing said compressional wave energy into electrical energy, the resonance frequency of said vibrator means varying with temperature; a resonance circuit for converting the electric energy supplied from said vibrator means into an electromagnetic wave whose frequency varies in response to the variation of said resonance frequency and emitting said electromagnetic wave, said resonance circuit consisting of said vibrator means and an inductance element having very low temperature dependency; and means for receiving said electromagnetic wave and detecting said resonance frequency.

References Cited by the Examiner

UNITED STATES PATENTS

| 2,721,267 | 10/1955 | Collins | 331—66 |
| 2,958,781 | 11/1960 | Marchal et al. | 250—83.3 |
| 2,996,611 | 8/1961 | Stahl. | |
| 2,999,926 | 9/1961 | Jenny | 325—105 |
| 3,098,993 | 7/1963 | Coop | 340—5 |

FOREIGN PATENTS 790,235  2/1958  Great Britain.

CHESTER L. JUSTUS, *Primary Examiner.*

R. A. FARLEY, *Assistant Examiner.*